United States Patent [19]

Wojtowicz

[11] Patent Number: 5,298,232
[45] Date of Patent: Mar. 29, 1994

[54] PROCESS FOR PREPARING SMALL PARTICLE SIZE SILVER CHLORIDE

[75] Inventor: John A. Wojtowicz, Cheshire, Conn.
[73] Assignee: Olin Corporation, Stamford, Conn.
[21] Appl. No.: 605,202
[22] Filed: Oct. 29, 1990
[51] Int. Cl.$^5$ .................................. C01B 9/02
[52] U.S. Cl. .................................. 423/491
[58] Field of Search .................. 423/491, 493

[56] References Cited

U.S. PATENT DOCUMENTS 3,056,185 10/1962 Langhans ............................ 423/491
4,919,716 4/1990 Nakao et al. ........................ 423/51

FOREIGN PATENT DOCUMENTS 2555364 12/1975 Fed. Rep. of Germany ....... 423/491

OTHER PUBLICATIONS

Mellor, J. W. "Comprehensive Treatise on Inorganic and Theoretical Chemistry", Longmans Green, vol. 3, 1946 pp. 391 and 393.

*Primary Examiner*—John Niebling
*Assistant Examiner*—Edna Wong
*Attorney, Agent, or Firm*—William A. Simons

[57] ABSTRACT

A process for making silver chloride particles having an average particle size of less than about 25 microns comprising:
(a) reacting silver metal particles having an average particle size of less than about 25 microns with chlorine gas in a chlorine-stable organic solvent for a sufficient amount of time to convert substantially all of said silver metal particles to silver chloride particles; and
(b) recovering said silver chloride particles from said organic solvent.

1 Claim, No Drawings

PROCESS FOR PREPARING SMALL PARTICLE SIZE SILVER CHLORIDE

BACKGROUND OF THE INVENTION

1. Field of the Invention

The present invention relates to a process for making small particle size silver chloride (AgCl). In particular, the present invention relates to a process for making small Particle size silver chloride by reacting silver metal particles with chlorine gas in a chlorine-stable organic solvent.

2. Brief Description of Relevant Art

Small size silver chloride (AgCl) particles are commonly used as a component in making silver/silver chloride conductive pastes. Such pastes are used in making human contact electrodes, such as those used for measuring cardiovascular activity. See U.S. Pat. No. 4,877,512, which issued to Bowns and Diepholz on Oct. 31, 1989 and is incorporated herein by reference in its entirety.

Small-size silver chloride particles have been conventionally prepared by reaction of silver nitrate with hydrochloride acid. The product made by this process has the disadvantage of being relatively expensive, owing to the high cost of the silver nitrate starting material. Silver chloride has also been made by passing gaseous chlorine over silver metal powder. It has been found that when this latter method is employed, the resulting silver chloride particles commonly agglomerate or fuse together. The thus-formed large size silver chloride particles are formed by the accompanying large heat of reaction and cannot be used in the above-noted conductive pastes. Instead, it is necessary to grind and screen those particles down to a suitable size. Such grinding and screening is time consuming and may greatly increase the cost of the resulting silver chloride product.

Accordingly, there is a need for a new, inexpensive process for making small-size silver chloride particles. It is believed that the present invention is a solution to that need.

BRIEF SUMMARY OF THE INVENTION

Accordingly, the present invention is directed to a process for making silver chloride particles having an average particle size of less than about 25 microns comprising:

(a) reacting silver metal particles having an average particle size of less than about 25 microns with chlorine gas in a chlorine stable organic solvent for a sufficient amount of time to convert substantially all of the silver metal particles to silver chloride particles, and (b) recovering said silver chloride particles from said organic solvent.

DETAILED DESCRIPTION

As explained above, the present invention is an inexpensive route for making small-size silver chloride particles.

Silver metal particles are one reactant for this for this process. Preferably, the silver particles have an average particle size of less than about 15 microns, most preferably, less than about 10 microns. One preferred silver metal product especially useful in present Process is CHEMET C-0002 available from Chemet Corporation of Attleboro, MA 02703. This product has an average particle size of about 1.32 microns (as measured by a Fisher Sub-sieve Sizer). This product's other physical characteristics include an apparent density (Scott Volumeter) of 0.59 g/cm$^3$, a Tap Density of 1.17 g/cm$^3$; and has the following Sinter Properties; a pressed density of 3.69 g/cm$^3$; a sintered density of 9.32 g/cm$^3$; a volume shrinkage of 60.6%; and a weight loss of 0.07%.

The other reactant for the present invention is gaseous chlorine. It may be obtained from any suitable source. Generally, it is preferred to use a molar excess of the chlorine gas. The chemical equation for making silver chlorine from silver powder and gaseous chlorine is as follows:

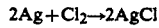

$$2Ag + Cl_2 \rightarrow 2AgCl$$

In other words, stoichiometrically two moles of silver must react with one mole of chlorine to make two moles of silver chloride. Since the chlorine gas is cheaper than the silver, it is easier to use a molar excess to ensure that the above reaction is driven to completion.

The critical feature of the present invention is carrying out the above reaction in a chlorine-stable organic solvent. As used herein, the term "chlorine-stable organic solvent" refers to an organic solvent which will not react with Cl$_2$ gas at the reaction temperatures employed. Preferably, the chlorine-stable organic solvent used is a chlorine-containing organic solvent. Examples include chloroform, carbon tetrachloride and methylene chloride. The most preferred chlorine-stable chlorine-containing organic solvent is chloroform.

The amount of solvent should be sufficient to cover the silver particles being reacted and permit contact between the chlorine gas and the silver particles so that the reaction will be completely carried out in a liquid medium. Most preferably, the minimum amount of solvent will be 1.5 ml of solvent per gram of silver.

The reaction is preferably started out at room temperature (i.e. about 20°-30° C.). Because the reaction is highly exothermic, cooling means should be provided to the reactor to moderate the increase in reaction mixture temperature. Unless a pressurized reactor is used, the reaction temperature preferably should not exceed the boiling temperature of the solvent employed.

The reaction should continue for a sufficient amount of time so that substantially all (i.e. at least about 95% conversion of the silver) of the silver particles are converted to silver chloride particles.

The reaction may be stopped by merely stopping the flow of chlorine gas from its source. Also, the reaction should preferably be carried out in the absence of light since silver chloride is easily reduced back to silver merely by exposure to light.

The formed silver chloride particles may be recovered from the reaction mixture by any suitable means. Generally, it is preferred to vacuum filter the formed silver chloride particles from the solvent and vacuum dry the particles in an oven at about 30°-60° C. to remove any residual solvent. Both the filtration and drying operation should preferably be carried out in the absence of light.

The following Comparison Examples and Examples further illustrate the present invention. All parts and percentages are by weight unless explicitly stated otherwise.

COMPARISON 1

The metallic silver powder (product code C-0002) used in this and the following examples was obtained from Chemet Corporation of Attleboro, MA. It had an average particle size of 1.32 microns as determined by the Fisher Sub-sieve Sizer (ASTM Method No. B330). All reactions were carried out in the absence of light to prevent discoloration of the silver chloride formed. Approximately 1 g of silver powder, contained in an Erlenmeyer flask and stirred magnetically, was contacted with pure gaseous chlorine. The unreacted chlorine was scrubbed in dilute caustic. The highly exothermic reaction resulted in fusion of the silver-silver chloride particles, forming a solid lump. After a 30-minute reaction Period, the conversion of silver to silver chloride was 50%.

COMPARISON 2

This experiment was carried out similarly to EXAMPLE 1 except the chlorine was diluted 1:5 with nitrogen to moderate the reaction. Although the reaction was less exothermic, some fusion of the reaction mixture still occurred.

EXAMPLES 1-3

Further experiments were carried out in solvents in order to moderate the reaction still further, thus eliminating agglomeration of the product. Preliminary small-scale experiments employing 1 g of silver Powder slurried in 25 ml of solvent contained in an Erlenmeyer flask. Gaseous chlorine was bubbled slowly into the magnetically stirred slurry by means of a fritted disc gas dispersion tube positioned beneath the surface of the solvent. After 1.5 hours, the slurry was filtered, the solids washed with 5 ml of solvent and the solids air dried. The conversion of silver was calculated from the increase in weight of the solid. The results are presented in Table I below. It is seen that chloroform was somewhat better than carbon tetrachloride in terms of silver conversion. A single experiment using methylene chloride showed little or no heat evolution indicating little or no reaction. The reason for this poor reaction is not known.

TABLE I

| Solvent | % Conversion of Silver |
| --- | --- |
| Methylene Chloride | <5 |
| Chloroform | 64 |
| Carbon Tetrachloride | 51 |

EXAMPLE 4

Following the procedure of EXAMPLE 3, chlorine was reacted with 1 g of silver powder slurried in 25 ml of chloroform. After a reaction period of seven hours (as compared to a 1.5 hour reaction time in EXAMPLE 3), the weight of the isolated product indicated a silver conversion of 96%.

EXAMPLE 5

In a larger-scale experiment, 40 g of silver powder slurried in 250 ml of chloroform was treated with gaseous chlorine over an 18-hour period. A light tan silver chloride product was isolated in approximately 100% yield. Scanning Electron Microscopy showed porous particles with only a small increase in size from the original silver metal particles (i.e. still in the 1-2 microns range) and having little or no agglomeration.

EXAMPLE 6

Based on the encouraging result of EXAMPLE 5, a much larger batch was prepared as described below to provide sufficient material for evaluation.

Chloroform (2L) and silver powder (978 g) were charged into a 3-L round-bottom flask fitted with stirrer, thermometer, condenser, chlorine sparge tube, and vent. Appropriate safety traps and a chlorine scrubber were also employed. Chlorine was passed into the stirred slurry via rotameter at about 1 g/min. The temperature was maintained below 40° C. by means of an ice-water bath. The reaction rate peaked at approximately two hours and then fell off. This is probably due to completion of a surface reaction which is followed by the much slower interior reaction which is dependent on diffusion of chlorine through the silver chloride coating. After five hours the chlorine feed was shut off and the mixture allowed to stir overnight. Resumption of the reaction on the next day showed only a small exotherm indicating that the reaction was near completion. To ensure high conversion of silver, the chlorine feed was continued for five more hours before being shut off. The mixture was stirred for an additional hour and then worked up by purging unreacted chlorine, filtering through a coarse frit filter, washing with fresh solvent (approximately 300 ml), and drying in a vacuum oven at ambient temperature using dry ice/acetone to condense the chloroform. The final weight of tan product was 1295 g indicating a 98.6% conversion of silver to silver chloride. The silver chloride particles were observed to be similar to the acceptable small particles size of the product of EXAMPLE 5.

EXAMPLE 7

Following the procedure of EXAMPLE 6, a still larger batch of silver chloride was made up. Chloroform (15 L) and silver powder (7.53 Kg) was charged into a clean, dry 22-L round bottom flask equipped with air stirrer, thermometer, condenser, and a coarse frit sparge tube. A caustic scrubber was employed to absorb unreacted chlorine. Chlorine gas was passed via rotameter into the well-stirred slurry at about 7.5 g/min. The temperature was maintained below 40° C. by means of an overflow-type water bath. After six hours the chlorine flow was decreased to about 0.5 g/minute and the mixture stirred overnight. A slow air purge was maintained through the scrubbers to prevent back-up. The chlorine flow was stopped and the residual chlorine was purged out of the system into the caustic scrubber. The slurry was transferred portionwise by pressure into a 2-L coarse frit filter funnel. After removing the solvent by water aspirator vacuum, the cake was washed with approximately 300 ml of fresh chloroform. The filter cake was placed into porcelain trays and dried to constant weight in a vacuum oven at 50° C. The dried product weighed approximately 10.0 Kg. The silver chloride Particles were observed to be similar in size to the acceptable small particle size of the product of EXAMPLE 5.

EXAMPLE 8

The Product prepared in EXAMPLE 6 was used to prepare a silver-silver chloride reference electrode for medical applications. The electrode performed satisfactorily in electrical performance evaluation tests.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All Patent applications, patents, and other publications cited herein are incorporated by reference in their entirety.

What is claimed is:

1. A process for making silver chloride particles having an average particle size of less than about 10 microns comprising:

(a) reacting in the absence of light silver metal particles having an average particle size of less than about 10 microns with a stoichiometrical molar excess of chlorine gas in chloroform for sufficient amount of time to convert substantially all of said silver metal particles to silver chloride particles;

(b) vacuum filtering in the absence of light said silver chloride particles from said chloroform after said reaction (a) has stopped; and (c) vacuum drying in the absence of light said filtered silver chloride at a temperature from about 30° C. to about 60° C. for a sufficient time to remove substantially all residual chloroform.

* * * * *